(12) United States Patent
Ziegler et al.

(10) Patent No.: US 9,346,341 B2
(45) Date of Patent: May 24, 2016

(54) DOOR STOP

(71) Applicant: Dr. Ing. h.c. F. Porsche Aktiengesellschaft, Stuttgart (DE)

(72) Inventors: Benny Ziegler, Calw (DE); Andreas Kohler, Bad Liebenzell (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 0 days.

(21) Appl. No.: 14/730,593

(22) Filed: Jun. 4, 2015

(65) Prior Publication Data

US 2015/0352931 A1 Dec. 10, 2015

(30) Foreign Application Priority Data

Jun. 6, 2014 (DE) .......................... 10 2014 108 023

(51) Int. Cl.
| | | |
|---|---|---|
| E05F 5/02 | (2006.01) | |
| E05C 17/22 | (2006.01) | |
| B60J 5/04 | (2006.01) | |
| E05F 5/08 | (2006.01) | |

(52) U.S. Cl.
CPC .................. B60J 5/0455 (2013.01); E05F 5/08 (2013.01); *Y10T 16/625* (2015.01)

(58) Field of Classification Search
CPC ... Y10T 16/61; Y10T 16/629; Y10T 16/6295; Y10T 292/285; Y10T 292/286; Y10T 292/304; E05C 17/12; E05C 17/20; E05C 17/203; E05C 17/206; E05C 17/22; E05C 17/26; E05C 17/24; E05C 17/28; E05C 17/18
See application file for complete search history.

(56) References Cited

U.S. PATENT DOCUMENTS

| | | | | |
|---|---|---|---|---|
| 4,788,743 A * | 12/1988 | Okumura | .............. | E05C 17/203 16/337 |
| 5,862,570 A * | 1/1999 | Lezuch | ................. | E05C 17/085 16/82 |
| 6,370,733 B2 * | 4/2002 | Paton | ................. | 16/82 |
| 2001/0029644 A1 * | 10/2001 | Audisio | ................ | E05C 17/206 16/49 |
| 2003/0037411 A1 * | 2/2003 | Seo | ........................ | E05C 17/206 16/86 C |
| 2003/0101537 A1 * | 6/2003 | Matsuki | ................ | E05C 17/206 16/85 |
| 2003/0159244 A1 * | 8/2003 | Sparkman | ............. | E05C 17/203 16/86 C |
| 2003/0163895 A1 * | 9/2003 | Liang | .................... | E05C 17/203 16/82 |
| 2006/0150367 A1 * | 7/2006 | Matsuki | ................ | E05C 17/206 169/86 C |
| 2007/0012687 A1 * | 1/2007 | Lowen | .................. | E05C 17/203 219/724 |
| 2008/0066260 A1 * | 3/2008 | Clark | .................... | E05C 17/203 16/86 A |
| 2009/0072552 A1 * | 3/2009 | Kitayama | ............. | E05C 17/203 292/262 |
| 2010/0154163 A1 * | 6/2010 | Hoffmann | ............. | E05C 17/203 16/85 |
| 2011/0016665 A1 | 1/2011 | Ng | | |
| 2012/0246871 A1 * | 10/2012 | Settsu | ..................... | E05F 5/025 16/83 |
| 2013/0055530 A1 * | 3/2013 | Gruber | .................. | E05C 17/203 16/85 |

FOREIGN PATENT DOCUMENTS

| | | | | |
|---|---|---|---|---|
| DE | 4005285 | | 8/1991 | |
| DE | EP 0478844 A1 * | | 4/1992 | ........... E05C 17/045 |
| DE | 29606304 | | 6/1996 | |

(Continued)

*Primary Examiner* — Chuck Mah

(74) *Attorney, Agent, or Firm* — Gerald E. Hespos; Michael J. Porco; Matthew T. Hespos

(57) ABSTRACT

A door stop is provided for a door of a motor vehicle. The door stop includes a latching rod guided by a housing. Springs in the housing act on the latching rod from all four sides so that the door can be held in designated positions.

10 Claims, 4 Drawing Sheets

(56) References Cited

FOREIGN PATENT DOCUMENTS

| DE | 102004034259 | | 2/2005 | | |
| DE | WO 2006000536 | A1 * | 1/2006 | ............ | E05C 17/203 |
| DE | 102004032250 | * | 2/2006 | ............ | E05C 17/203 |
| EP | 0805251 | | 11/1997 | | |
| JP | 07331944 | A * | 12/1995 | | |
| JP | 2003301650 | A * | 10/2003 | | |
| JP | 2003336424 | A * | 11/2003 | | |

* cited by examiner

DOOR STOP

CROSS REFERENCE TO RELATED APPLICATION

This application claims priority under 35 USC 119 to German Patent Appl. No. 10 2014 108 023.8 filed on Jun. 6, 2014, the entire disclosure of which is incorporated herein by reference.

BACKGROUND

1. Field of the Invention

The invention relates to a door stop for positioning a door of a motor vehicle.

2. Description of the Related Art

DE 10 2004 034 259 A1 discloses a door stop that is guided in a holder connected to a vehicle door. A holding rod is connected to an A-pillar via a bearing eye and a "braking device" is in engagement with the holding rod. The braking device has a metallic spring wire that laterally surrounds the holding rod. US 2011/0016665 A1 discloses a door stop with vertical catches. The door stop is guided in a holder mounted on the door and is fastened at a free end to the body shell.

It is an object of the invention to provide a door stop for precise and comfortable positioning for a door of a motor vehicle.

SUMMARY OF THE INVENTION

The invention relates to a door stop where the vehicle door is held precisely positioned during opening and has a necessary holding force. This is achieved according to the invention by a latching rod guided in the basic housing in two planes of action that are independent of each other. The one plane of action has horizontally arranged alternating latching depressions and flattened portions arranged in an upper and lower surface of the latching rod. The latching depressions and flattened portions are engaged with spring elements acting in a vertical direction of force. The second plane of action has vertically arranged alternating latching depressions and flattened portions provided on side surfaces of the latching rod. The latching depressions and flattened portions are arranged on each side of the latching rod engage with spring elements that are oriented vertically in the basic housing and act in the horizontal direction of force. This arrangement of the latching depressions and flattened portions arranged in horizontal and vertical planes of action enable the corresponding spring elements to engage effectively when the door is opened and can bring the door into a desired position and can hold the desired position. The additional vertical spring elements and the corresponding catches in the vertical plane enable further latching functions and an influence on an action characteristic.

The horizontally and vertically arranged latching depressions and flattened portions are arranged in the latching rod in a manner corresponding to one another in the two planes of action. This arrangement of the catches and flattened portions enable the spring elements to be arranged either in a same plane or at a distance from one another.

The spring elements oriented vertically in the basic housing may include at least two spring wires formed independently of each other. The spring wires may be hooked in the latching depressions to provide a pretensioning of the spring wires. Other spring elements that bring about a horizontal tension can be used instead of spring wires.

Each spring wire may be held by end-side spring wire portions in a head of the basic housing. An upper and lower fastening plate may be screwable to the head of the basic housing via bolts, and the free protruding ends of the spring wires are accommodated in a holding manner in the fastening plate. This arrangement of the spring wires in the head of the basic housing and by the free ends in the fastening plates brings about reinforced guidance for the spring wires.

The spring elements acting vertically and horizontally act on all four sides on the latching rod. As a result, the two independent planes of action are formed in such a manner that variable action characteristics can be set. These additional vertical spring elements and latching depressions enable further latching functions and a substantial influence on a defined action characteristic to be obtained.

An exemplary embodiment of the invention is illustrated in the drawings and is described in more detail below.

DETAILED DESCRIPTION

Figure 1:
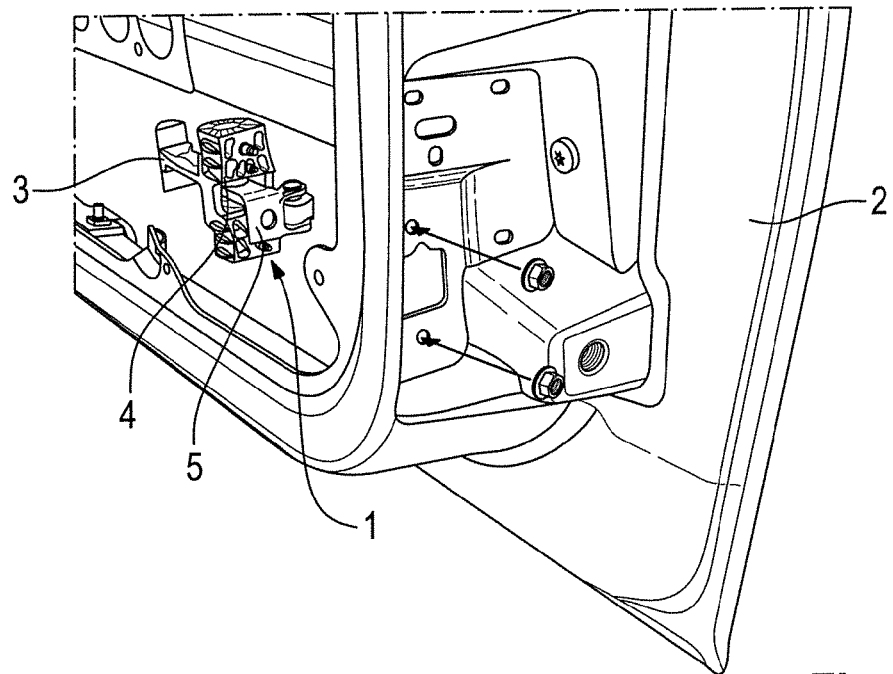
FIG. 1 shows a view of a vehicle door with a door stop arranged in a pre-installation position.
Figure 2:
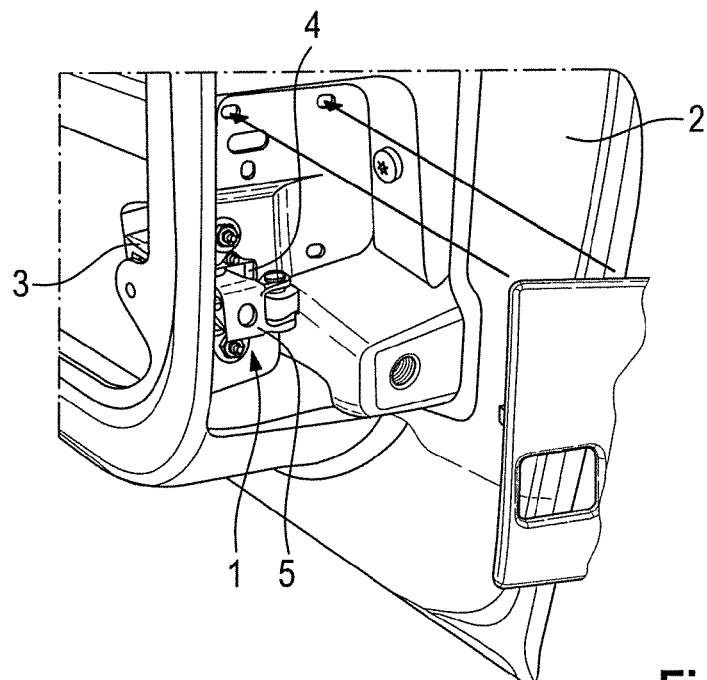
FIG. 2 shows a view according to FIG. 1 with a door stop arranged in an installation position.
Figure 3:
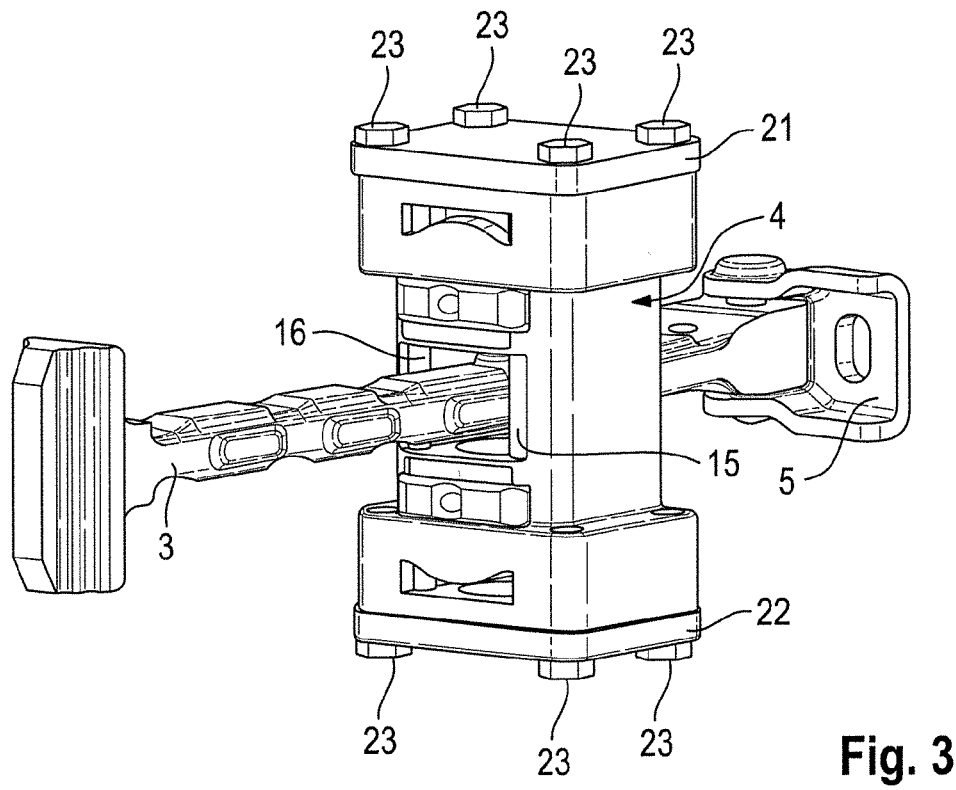
FIG. 3 shows a view of the door stop with a latching rod which is guided in a basic housing, with fastening plates on the basic housing.
Figure 4:
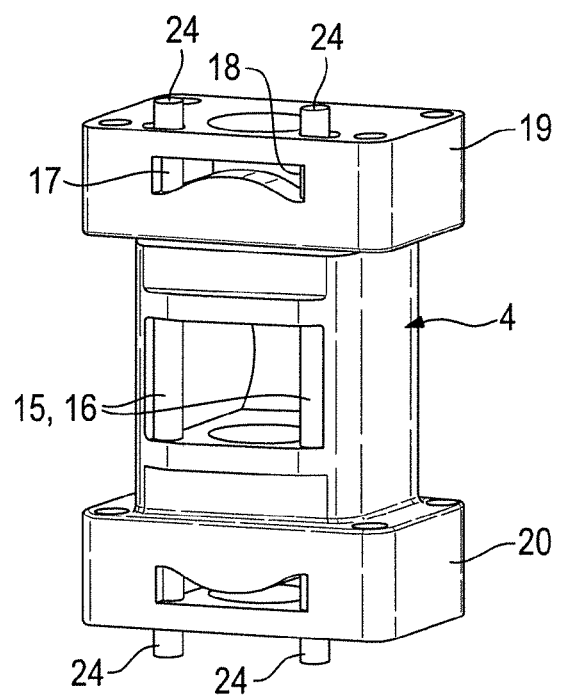
FIG. 4 shows a view of the basic housing with the vertical spring elements without fastening plates.
Figure 5:
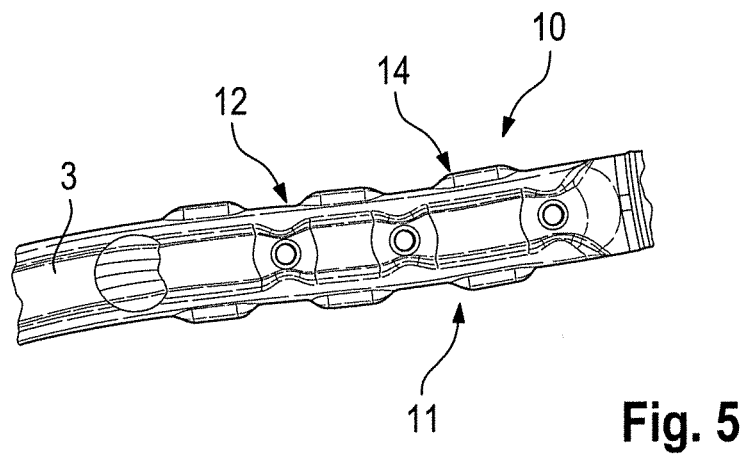
FIG. 5 shows a view from above of the latching rod with horizontal and vertical latching depressions and flattened portions.
Figure 6:
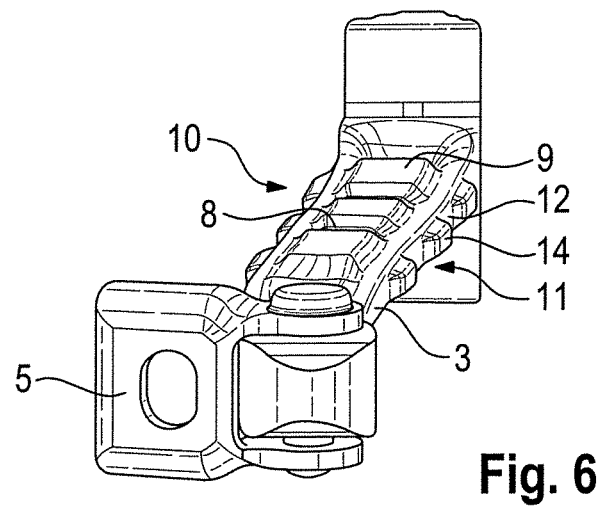
FIG. 6 shows a view from the front of the latching rod.
Figure 7:
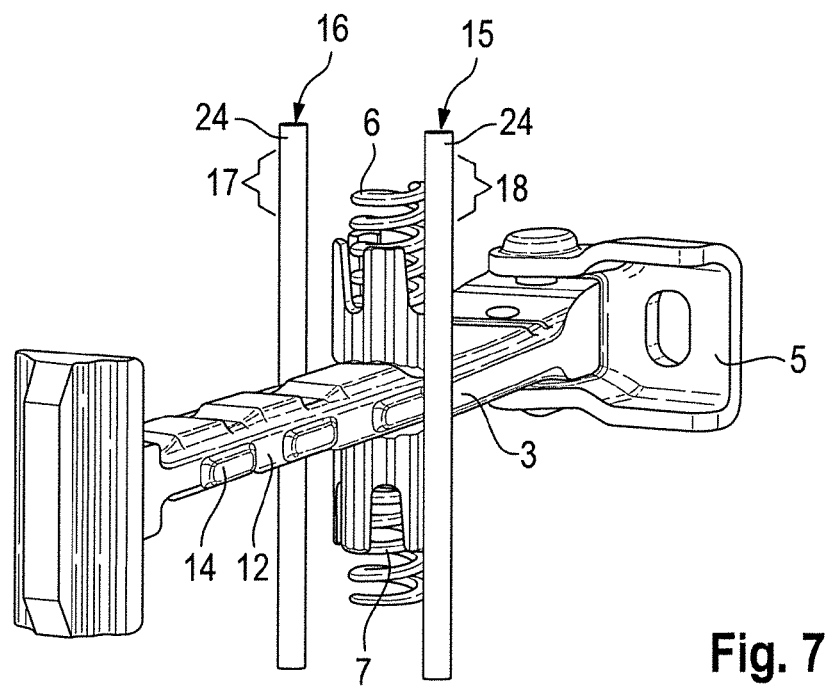
FIG. 7 shows a view of the latching rod with spring elements acting horizontally laterally and further spring elements acting vertically centrally.
Figure 8:
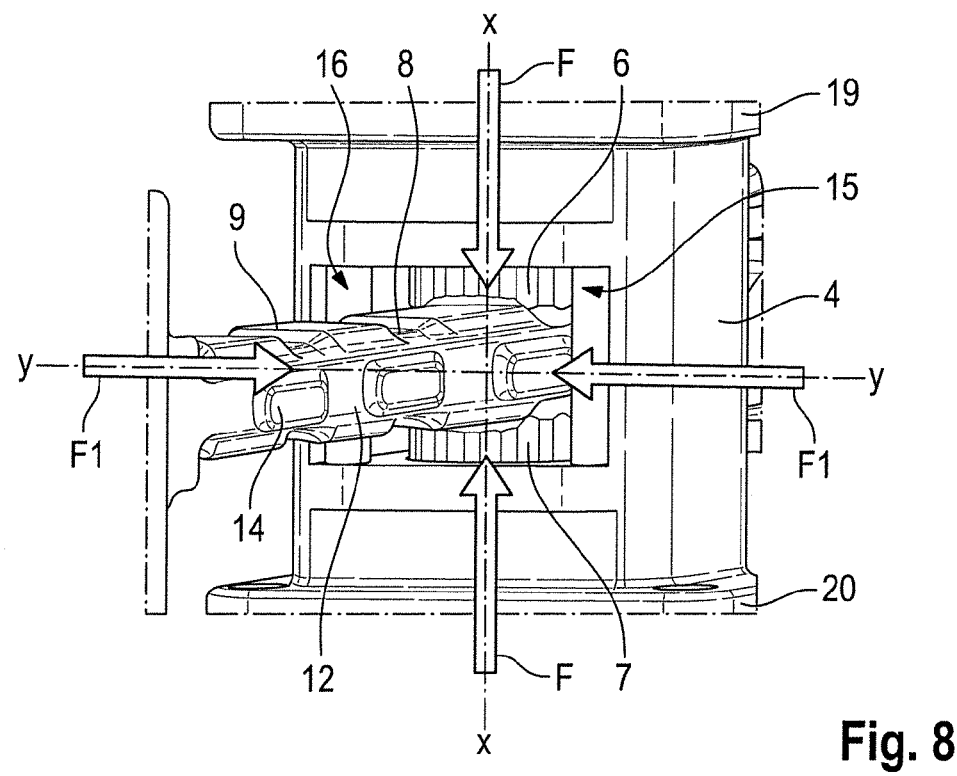
FIG. 8 shows a view of the basic housing with spring elements acting horizontally and vertically on the latching rod.

A door stop 1 for a vehicle door 2 of a motor vehicle enables the vehicle door 2 to be positioned. The door stop 1 comprises a latching rod 3 that is guided in a positionally fixed basic housing 4. The latching rod 3 is fastened in an articulated manner at one end 5 to the body shell of the vehicle. The latching rod 3 is guided in the basic housing 4 in first and second planes of action x-x and y-y that are independent of each other. In the first plane of action x-x, spring elements 6, 7 acting in the vertical direction of force F are engaged with the latching depressions and flattened portions 8, 9. In the second plane of action y-y, latching depressions and flattened portions 12, 14 arranged on the side surfaces 10, 11 of the latching rod 1 are in engagement with spring elements 15, 16 that are oriented vertically in the basic housing 4 and act in a horizontal direction of force F1, on each side of the latching rod 3.

According to the invention, horizontally and vertically arranged latching depressions and flattened portions 8, 9 and 12, 14 are arranged in the latching rod 3 in a manner corresponding to one another in the two planes of action x-x, y-y.

The vertically oriented spring elements 15, 16 in the basic housing 4 have at least two spring wires formed independently of each other. Instead of the spring wires, spring elements that are designed differently and are active in the horizontal direction of force F1 are also conceivable.

The spring elements 15, 16 are in each case held by end-side spring wire portions 17, 18 in a head 19, 20 of the basic housing 4. A fastening plate 21, 22 is in each case screwable to the basic housing 4 on the upper and lower side via bolts 23. The free protruding ends 24 of the spring wire portions 17, 18 are fixed and held in the fastening plate 21, 22.

The spring elements 6, 7 and 15, 16 acting vertically and horizontally with the direction of force F and F1 act on the latching rod 3 from four sides forming the two planes of action x-x and y-y, which are independent of each other, in such a manner that variable action characteristics can be set. By means of these planes of action x-x and y-y which are independent of each other, an improved latching function of the door and therefore greater comfort are achieved. For this purpose, the holding force or the force which is required in order to bring the door into the desired position is crucial for the comfort.

What is claimed is:

1. A door stop for positioning a door of a motor vehicle, the door stop comprising a latching rod guided in a basic housing connected to the vehicle door and connected at one end to a body shell of the vehicle, the latching rod being guided in the basic housing in horizontal and vertical planes of action that are independent of each other, wherein, in the horizontal plane of action, horizontally arranged, alternating latching depressions and flattened portions are arranged in an upper and lower surface of the latching rod, said latching depressions and flattened portions being in engagement with spring elements acting in a vertical direction of force, and in the vertical plane of action alternating latching depressions and flattened portions are provided on side surfaces of the latching rod, the latching depressions and flattened portions being engaged with spring elements oriented vertically in the basic housing and act in a horizontal direction of force and are arranged on each side of the latching rod.

2. The door stop of claim 1, wherein the horizontally and vertically arranged latching depressions and latching flattened portions and are arranged in the latching rod in each case in a manner corresponding to one another in the two planes of action.

3. The door stop of claim 1, wherein the spring elements oriented vertically in the basic housing comprise at least two spring wires formed independently of each other.

4. The door stop of claim 3, wherein each of the spring wires is held by end-side spring wire portions in a head of the basic housing, the head being screwable to upper and lower fastening plates by bolts, and the fastening plates accommodate free protruding ends of the spring wire portions in a holding manner.

5. The door stop of claim 1, wherein the spring elements acting vertically and horizontally in the directions of force act on all four sides on the latching rod, as a result of which the two planes of action which are independent of each other are formed in such a manner that a variable action characteristic can be set.

6. A door stop for positioning a door of a motor vehicle, the door stop comprising:
   a latching rod having an end connected to a body shell of the vehicle, the latching rod having opposite top and bottom surfaces and opposite side surfaces, the top and bottom surfaces of the latching rod being formed with an alternating array of latching depressions and flattened portions, the side surfaces of the latching rod being formed with an alternating array of latching depressions and flattened portions; and
   a housing connected to the vehicle door and having an opening through with the latching rod is passable, vertical spring elements mounted in the housing and acting vertically for engaging selected ones of the latching depressions or flattened portions in the top and bottom surfaces of the latching rod, and lateral spring elements mounted in the housing an acting horizontally for engaging selected ones of the latching depressions or flattened portions provided on the side surfaces of the latching rod.

7. The door stop of claim 6, wherein the latching depressions in the top and bottom surfaces align with the latching depressions in the side surfaces.

8. The door stop of claim 6, wherein the spring elements that engage the side surfaces of the latching rod are separate spring wires.

9. The door stop of claim 8, wherein each of the spring wires is held by end-side spring wire portions in a head of the housing.

10. The door stop of claim 6, wherein all of the spring elements act independently on all four sides on the latching rod so that a variable action characteristic can be set.

* * * * *